United States Patent [19]

Nishioka et al.

[11] Patent Number: 4,666,246

[45] Date of Patent: May 19, 1987

[54] ILLUMINATING OPTICAL SYSTEM FOR ENDOSCOPES

[75] Inventors: Kimihiko Nishioka, Hachiouji; Hiroyuki Kimura, Suita, both of Japan

[73] Assignee: Olympus Optical Co., Ltd., Tokyo, Japan

[21] Appl. No.: 652,566

[22] Filed: Sep. 20, 1984

[30] Foreign Application Priority Data

Sep. 20, 1983 [JP] Japan .................. 58-173628

[51] Int. Cl.$^4$ ............................... G02B 6/06
[52] U.S. Cl. .................. 350/96.25; 350/96.26
[58] Field of Search ............ 350/96.18, 96.25, 96.26, 350/96.24, 96.27

[56] References Cited

U.S. PATENT DOCUMENTS

| | | | |
|---|---|---|---|
| 3,918,072 | 11/1975 | Imai et al. | 350/96.26 |
| 3,918,438 | 11/1975 | Hayamizu et al. | 350/96.26 |
| 4,101,196 | 7/1978 | Imai | 350/96.25 |
| 4,273,109 | 6/1981 | Enderby | 350/96.26 |
| 4,354,734 | 10/1982 | Nakahashi | 350/96.26 |
| 4,483,585 | 11/1984 | Takami | 350/96.18 |
| 4,500,181 | 2/1985 | Takahashi | 350/96.26 |
| 4,529,267 | 7/1985 | Nishioka et al. | 350/96.26 |

FOREIGN PATENT DOCUMENTS

| | | | |
|---|---|---|---|
| 58-66910 | 4/1983 | Japan | 350/96.26 |
| 58-72118 | 4/1983 | Japan | 350/96.26 |
| 58-95706 | 6/1983 | Japan | 350/96.26 |

*Primary Examiner*—William L. Sikes
*Assistant Examiner*—Robert E. Wise
*Attorney, Agent, or Firm*—Cushman, Darby & Cushman

[57] ABSTRACT

An illuminating optical system for endoscopes comprising a light guide, a concave lens arranged in front of the exit end of the light guide and having a peripheral part weak in the refractive power and a plate-shaped transparent member interposed between the light guide and concave lens, in order to ensure a sufficient illuminating light amount on the periphery of the visual field and decrease the light amount loss. The transparent member and the concave lens may be respectively formed of a single fiber, and an optical member formed of a single fiber may be arranged in front of the concave lens to extend the total length of the optical system.

20 Claims, 7 Drawing Figures

ILLUMINATING OPTICAL SYSTEM FOR ENDOSCOPES

BACKGROUND OF THE INVENTION (a) Field of the invention:

This invention relates to an illuminating optical system for endoscopes.

(b) Description of the prior art:

Generally, in an endoscope, an illuminating optical system using a light guide is built-in. However, there has been a defect that the light emitted from such light guide is so low in the intensity toward the periphery that the periphery of the visual field is dark.

Therefore, it has been generally practiced to arrange a concave lens 3 in front of the emitting end 2a of a light guide 2 within an endoscope tip part 1 as shown in FIG. 1. However, in this formation, the illuminating light amount on the periphery increases but can not be said to be sufficient and the periphery of the visual field is still dark. Further, there has been a defect that, in case the concave lens 3 is made the refractive power stronger to increase the peripheral light amount, as shown in FIG. 2, a part of the light emitted from the peripheral part of the exit end 2a of the light guide 2 will be all reflected by the exit surface of the concave lens 3 as shown by the arrow A and therefore the loss of the illuminating light amount on the periphery will be large.

SUMMARY OF THE INVENTION

In view of the above mentioned points, a primary object of the present invention is to provide an illuminating optical system for endoscopes wherein the illuminating light amount on the periphery of the visual field is sufficient and the light amount loss is less.

According to the present invention, this object is attained by arranging a concave lens having a weaker refractive power in the peripheral part in front of the exit end of a light guide. The peripheral part of the concave lens is shaped as a flat surface, a concave lens of a large radius of curvature or a convex lens of a large radius of curvature. Thereby, a light parallel with the axis of the light guide and a light at an angle with said axis will illuminate the peripheral part of the visual field of the endoscope, the light amount will not be lost by total reflection on the exit end surface in such case and therefore a bright illumination will be able to be made over the entire visual field.

According to a preferred formation of the present invention, a transparent member is interposed between the exit end of the light guide and the concave lens and at least one of the concave lens and transparent member is formed of single fibers. Thereby, an illuminating system for endoscopes lower in the light amount loss can be obtained.

This and other objects of the present invention will become more apparent during the course of the following detailed description and appended claims.

DETAILED DESCRIPTION OF THE PREFERRED EMBODIMENTS

Figure 1:
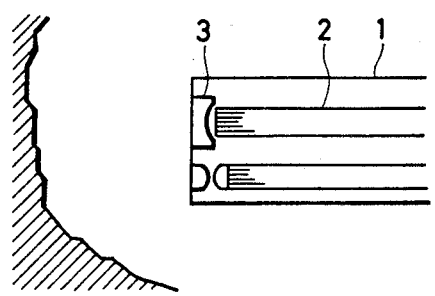
FIG. 1 is a schematic view showing a conventional illuminating optical system for endoscope.
Figure 2:
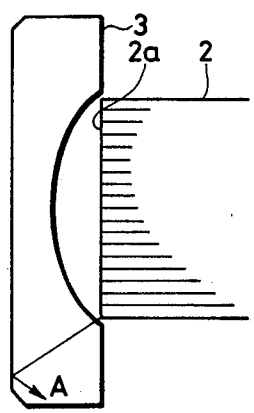
FIG. 2 is a enlarged view of a part of FIG. 1.
Figure 3:
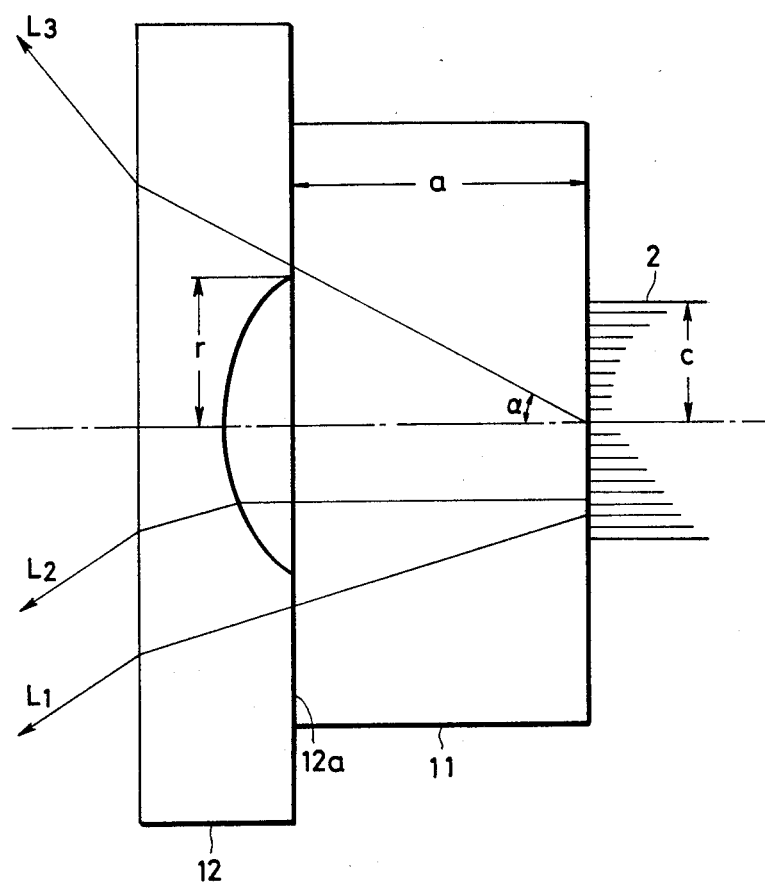
FIG. 3 is a schematic view showing an embodiment of the illuminating optical system for endoscopes according to the present invention.

The present invention shall be explained in the following with reference to the embodiments shown in the drawings. The first embodiment of the present invention is shown in FIG. 3. The reference numeral 11 denotes such transparent member as, for example, a glass plate and 12 denotes a concave lens having a flat light passing part on the periphery.

As this embodiment is formed as in the above, a light $L_1$ at an angle with the axis of the light guide 2 will pass through the flat light passing part 12a of the concave lens 12 and will illuminate the peripheral part of the visual field of the endoscope and a light $L_2$ parallel with the axis of the light guide 2 will pass through the central lens part of the concave lens 12, will be therefore refracted by the action of the lens and will illuminate the peripheral part of the visual field of the endoscope. Here, in case the semi-diameter of the light guide 2 is represented by c, the semi-diameter of the lens part of the concave lens 12 is represented by r, the thickness of the transparent member 11 is represented by a and the angle of inclination within the transparent member 11 of a light $L_3$ having a maximum angle of inclination to the axis of the light guide 2 is represented by $\alpha$, in order to obtain a flavorable illuminating light, it will be required to satisfy the under-mentioned two conditional formulae (1) and (2).

That is to say, in order that all the lights parallel with the axis of the light guide 2 may be refracted by the lens part of the concave lens 12, $$r > c \tag{1}$$

must be satisfied and, in order that at least one of the light rays to be led by each of all the light guide fibers may pass through the flat light passing part 12a of the concave lens 12, $$a \cdot \tan \alpha > r \tag{2}$$

must be satisfied. Now, in the formula (1), the light parallel with the axis may pass through the flat light passing part 12a without being refracted to some extent and therefore the condition can be relaxed until $$r > 0.5c \tag{1'}$$

Also, in the formula (2), even if the light having the maximum angle of inclination passes through the lens part of the concave lens 12, the intensity of the light will be so weak that the loss will be slight and therefore the condition will be able to be relaxed until $$a \cdot \tan \alpha > (r/3) \tag{2'}$$

From the combination of forumulae (1) and (2), a·tan $\alpha > r > c$ is obtained and from formulae (1)' and (2)', 3a·tan $\alpha > r > \frac{1}{2}c$ is determined.

Figure 4:
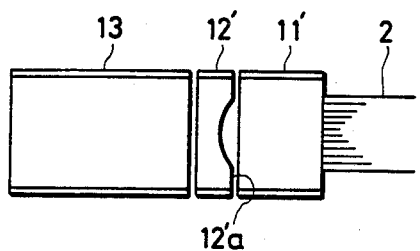
FIGS. 4, 5, 6 and 7 are views showing respectively other embodiments different from one another according to the present invention.

FIG. 4 shows another embodiment of the present invention. The reference numeral 11' denotes a transparent member formed of a single fiber, 12' denotes a concave lens formed of a single fiber and having a flat light passing part 12'a on the periphery and 13 denotes an optical member formed of a single fiber and for extending the total length of the optical system. The operation of the optical member 13 is the same as in the embodiment in FIG. 3. As the single fiber is used, there will be no loss of the light amount. Therefore, the optical system can be made thinner and smaller.

Figure 5:
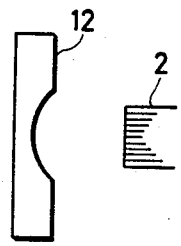

FIG. 5 shows another embodiment of the present invention. This embodiment is the same as that of FIG. 3 in its formation and function, except that the transparent member 11 is provided between the light guide 2 and the concave lens 12 in FIG. 3. In case the transparent member is not provided as mentioned now, when the distance between the concave lens and the exit end of the light guide is represented by a and the angle of inclination made by light having the maximum angle with the optical axis among light emitted from the light guide is represented by $\alpha$, it is only necessary to arrange each component to satisfy, similar to the embodiment of FIG. 3, such relations as shown by formulae:

$$a \cdot \tan \alpha > r > c$$

and $$3a \cdot \tan \alpha > r > \tfrac{1}{2}c.$$

Figure 6:
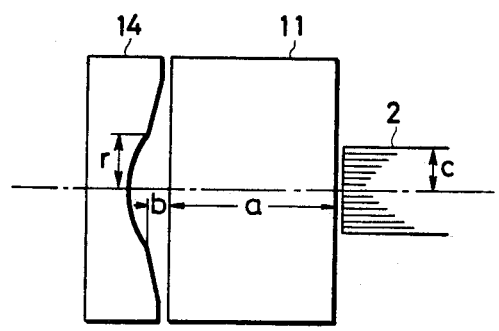

In FIG. 6, instead of the concave lens 12 having the flat light passing part 12a on the periphery in the embodiment in FIG. 3, a double concave lens 14 having a concave lens part in which refractive power is weaker than in the center part and a concave lens part in which refractive power is stronger than in the peripheral part is arranged. In this case, a range wider than in the embodiment in FIG. 3 can be illuminated and the conditional formulae (1)' and (2)' can be applied but, on the conditional formula (2)', instead of the thickness a of the transparent member 11, a thickness a' given by $a' = a + nb$ (wherein the symbol n represents the refractive index of the transparent member 11 and b represents the distance between the boundary line of the two convex lens parts of the double lens and the exit end face of the transparent member) is used and a conditional formula of $$a' \cdot \tan \alpha = (a + nb) \tan \alpha > (r/3)$$

is applied. That is to say, in case the transparent member and air space are provided between the exit end face of the light guide and the concave lens, it is only necessary to use the sum of the thickness of the transparent member and the value obtained by multiplying the length of the air space by the refractive index of the transparent member, instead of the thickness of the transparent member in FIG. 3.

Figure 7:
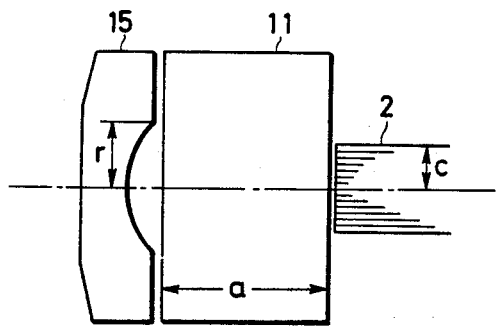

In FIG. 7, instead of the concave lens 12 having the flat light passing part 12a on the periphery in the embodiment in FIG. 3, a concave lens 15 having a convex lens part in which refractive power is weaker than in the center part and a concave lens part in the center part is arranged. Therefore, the light having passed through the peripheral part of the concave lens 15 will be a little condensed by the action of the convex lens part and will illuminate the peripheral part of the visual field of the endoscope. This formation will be effective particularly in case the light distribution of the light guide 2 itself is comparatively wide.

By the way, it is needless to say that, in all of the above embodiments, the shapes of the concave lens and convex lens may be nonspherical. In the embodiments in FIGS. 6 and 7, if the concave lens 14 or 15 is formed of a plastic glass molding or the like, it will be able to be produced more cheaply.

What is claimed is:

1. An illuminating optical system for endoscopes wherein said system is provided with a light guide, a concave lens arranged on the exit end side of said light guide and having, around a center part, a peripheral part in which refractive power is weaker than in said center part and a transparent plate arranged between said concave lens and the exit end face of said light guide, and the positions and sizes of said light guide, said transparent plate and said concave lens are selected to satisfy the following formula:

$$3(a + nb) \tan \alpha > r > \tfrac{1}{2}c$$

where a is the thickness of the transparent plate, n is the refractive index of the transparent plate, b is the length obtained by deducting the thickness of the transparent plate from the distance between the exit end face of the light guide and the boundary line between the center part and the peripheral part of the concave lens, $\alpha$ is the maximum value of the angle made by light emitted from the light guide with the optical axis in the transparent plate, r is the radius of the concave lens in the center part, and c is the radius of the exit end face of the light guide.

2. An illuminating optical system for endoscopes according to claim 1, wherein said system satisfies the following formula:

$$(a + nb) \tan \alpha > r > c.$$

3. An illuminating optical system for endoscopes according to claim 1 or 2, wherein said peripheral part in which the refractive power is weaker is formed in the shape of a flat plate.

4. An illuminating optical system for endoscopes according to claim 3, wherein said concave lens and said transparent plate are formed of single fibers.

5. An illuminating optical system for endoscopes according to claim 4, wherein said transparent plate comprising the single fibers is arranged on the exit end side of said concave lens.

6. An illuminating optical system for endoscopes according to claim 1 or 2, wherein said peripheral part in which the refractive power is weaker is formed in the shape of a convex lens.

7. An illuminating optical system for endoscopes according to claim 6, wherein said concave lens and said transparent plate are formed of single fibers.

8. An illuminating optical system for endoscopes according to claim 7, wherein said transparent plate comprising the single fibers is arranged on the exit end side of said concave lens.

9. An illuminating optical system for endoscopes according to claim 1 or 2, wherein said peripheral part in which the refractive power is weaker is formed in the shape of a concave lens whose radius of curvature is larger than in the center part.

10. An illuminating optical system for endoscopes according to claim 9, wherein said concave lens and said transparent plate are formed of single fibers.

11. An illuminating optical system for endoscopes wherein said system is provided with a light guide and a concave lens arranged on the exit end side of said light guide and having, around a center part, a peripheral part in which refractive power is weaker than in said center part, and the positions and sizes of said light guide and said concave lens are selected to satisfy the following formula:

$$3a \cdot \tan \alpha > r > \tfrac{1}{2}c$$

where a is the distance between the exit end of the light guide and the concave lens, $\alpha$ is the maximum value of the angle made by light emitted from the light guide with the optical axis, r is the radius of the concave lens in the center part, and c is the radius of the exit end face of the light guide.

12. An illuminating optical system for endoscopes according to claim 11, wherein said system is satisfied with the following formula:

$$a \cdot \tan \alpha > r > c.$$

13. An illuminating optical system for endoscopes according to claim 11 or 12, wherein said peripheral part in which the refractive power is weaker is formed in the shape of a flat plate.

14. An illuminating optical system for endoscopes according to claim 13, wherein said concave lens and said transparent plate are formed of single fibers.

15. An illuminating optical system for endoscopes according to claim 14, wherein said transparent plate comprising the single fibers is arranged on the exit end side of said concave lens.

16. An illuminating optical system for endoscopes according to claim 11 or 12, wherein said peripheral part in which the refractive power is weaker is formed in the shape of a convex lens.

17. An illuminating optical system for endoscopes according to claim 16, wherein said concave lens and said transparent plate are formed of single fibers.

18. An illuminating optical system for endoscopes according to claim 11 or 12, wherein said peripheral part in which the refractive power is weaker is formed in the shape of a concave lens whose radius of curvature is larger than in the center part.

19. An illuminating optical system for endoscopes according to claim 18, wherein said concave lens and said transparent plate are formed of single fibers.

20. An illuminating optical system for endoscopes according to claim 19, wherein said transparent plate comprising the single fibers is arranged on the exit end side of said concave lens.

* * * * *